Sept. 11, 1934.  J. A. COY  1,972,856
ILLUMINATING SYSTEM
Filed April 13, 1932  4 Sheets-Sheet 1
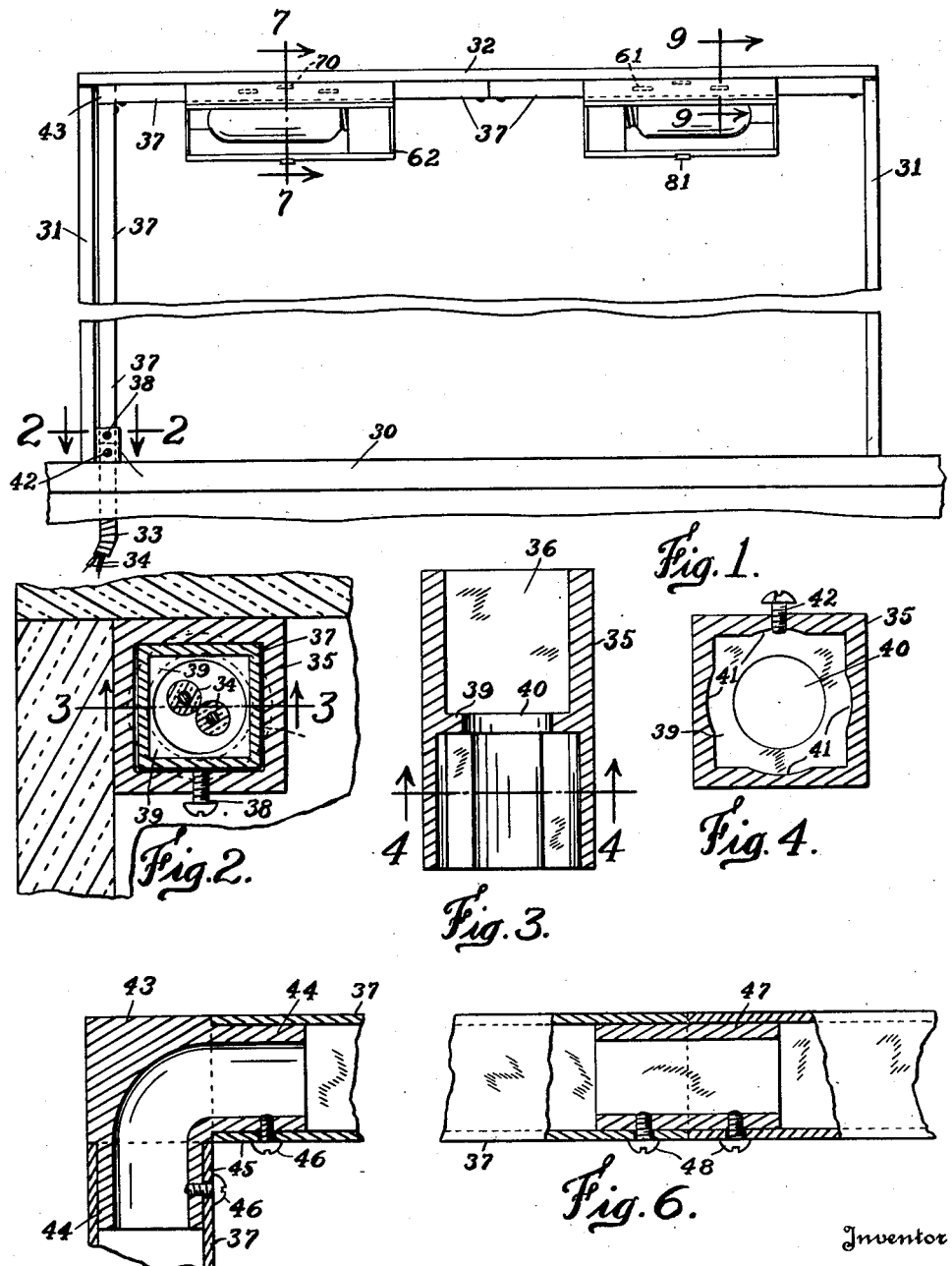

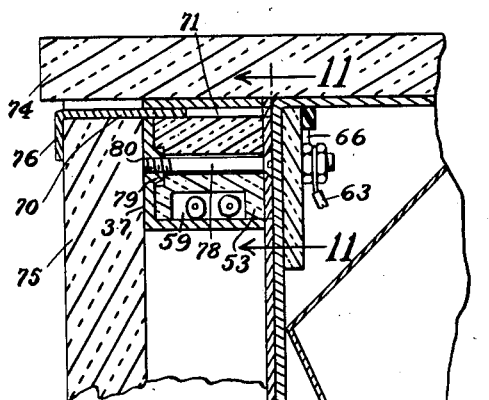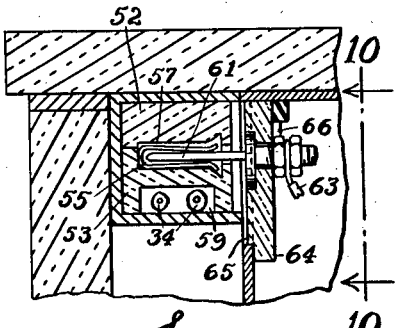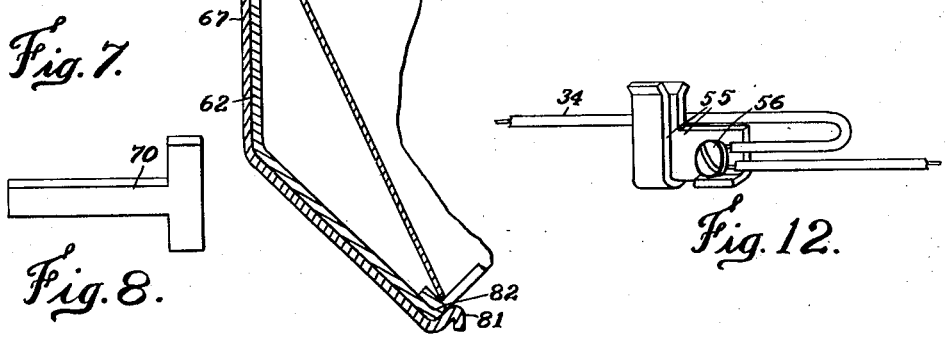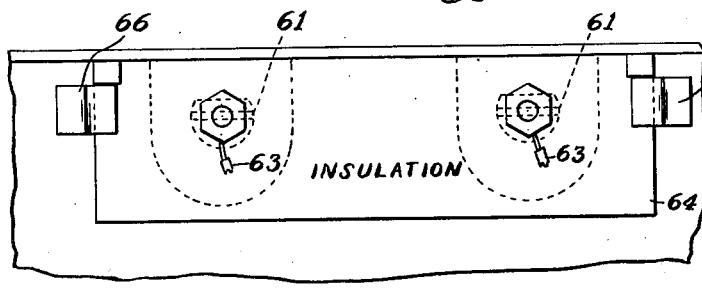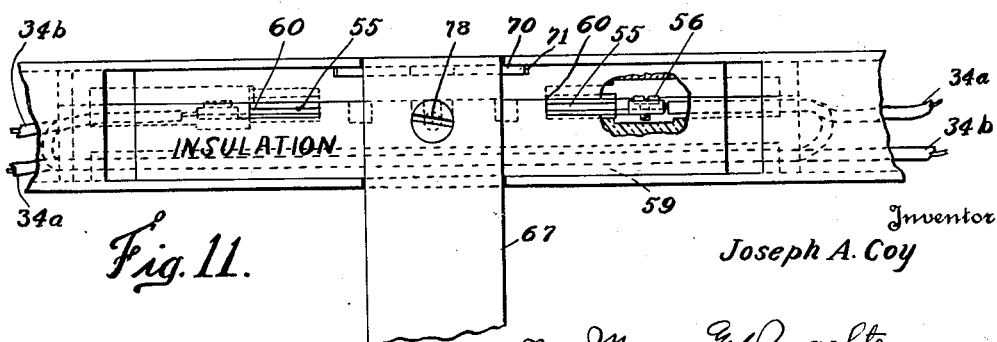

Sept. 11, 1934.  J. A. COY  1,972,856
ILLUMINATING SYSTEM
Filed April 13, 1932   4 Sheets-Sheet 3
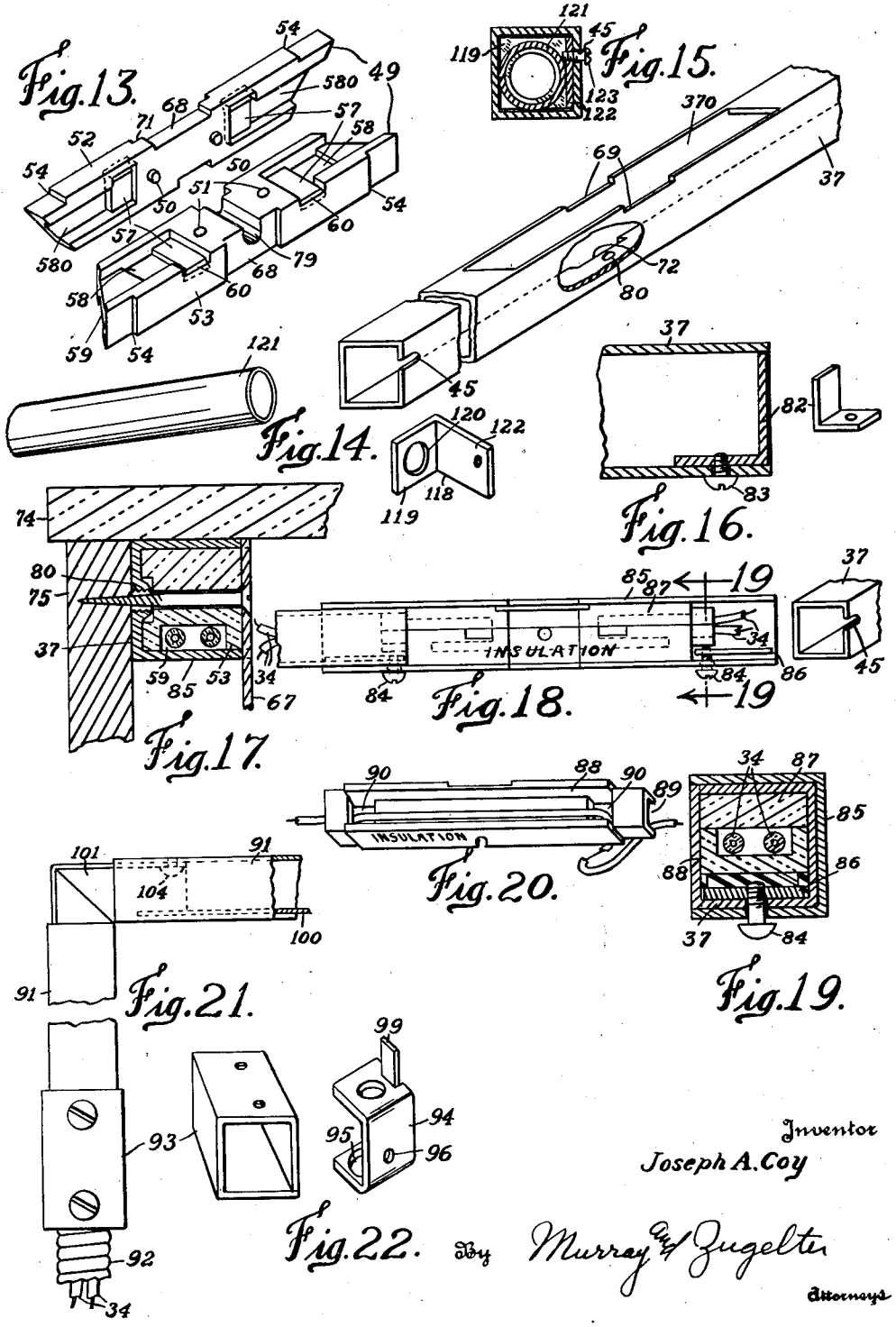
Inventor
Joseph A. Coy
By Murray & Zugelter
Attorneys Sept. 11, 1934.   J. A. COY   1,972,856
ILLUMINATING SYSTEM
Filed April 13, 1932   4 Sheets-Sheet 4
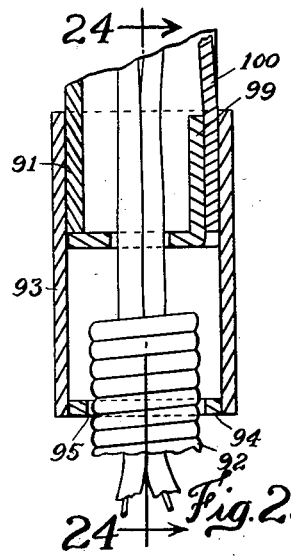
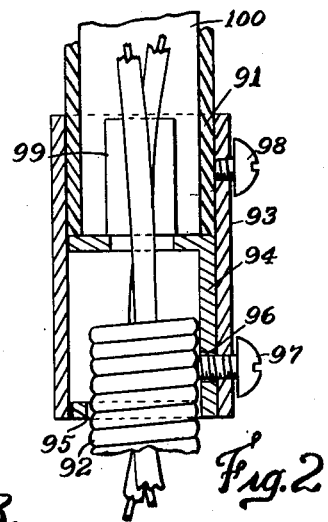
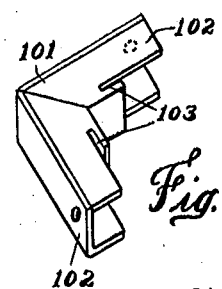
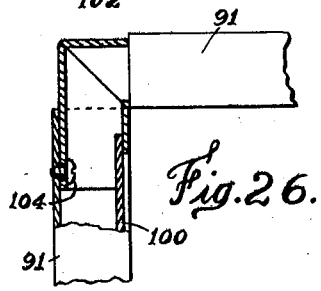
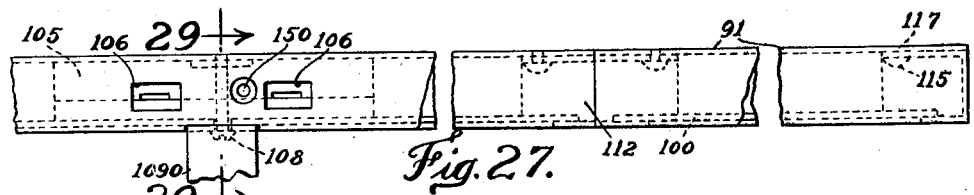
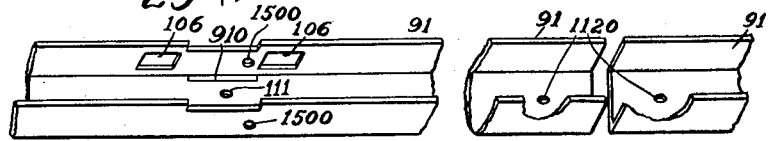
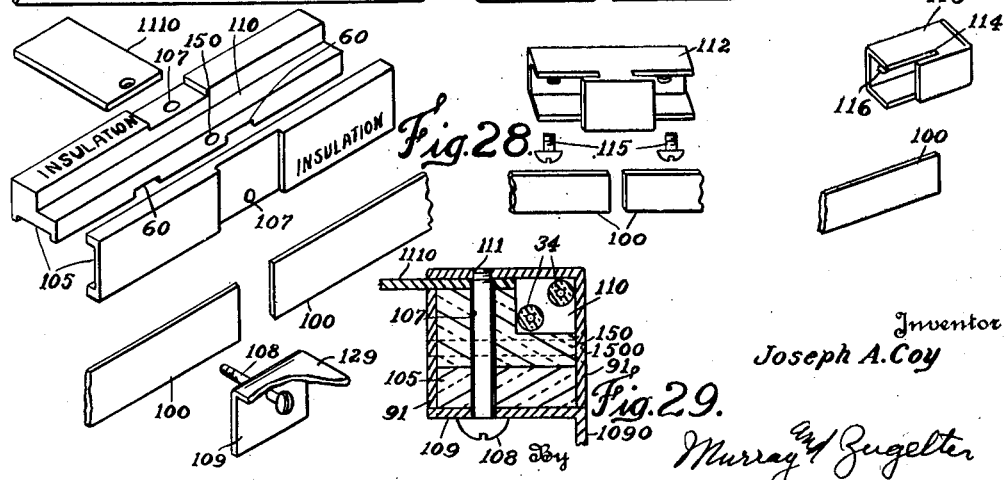
Inventor
Joseph A. Coy
By Murray & Zugelter
Attorneys Patented Sept. 11, 1934

1,972,856

UNITED STATES PATENT OFFICE 1,972,856

ILLUMINATING SYSTEM

Joseph A. Coy, Norwood, Ohio, assignor to The Wadsworth Electric Manufacturing Company, Covington, Ky., a corporation of Kentucky Application April 13, 1932, Serial No. 605,038

12 Claims. (Cl. 240—6)

This invention relates to show case, display case and similar types of illumination and has for its object the provision of a very simple and easily installed wire carrying member provided at intervals within the body lines thereof with prong receiving receptacles, and lighting units which may be instantly mounted on and removed from such receptacles.

Another object is to provide a simple and inexpensive arrangement of small wiring conduits or channels with connections adapting the arrangement universally to practically any installation with a minimum of effort.

Another object is to provide a preferably small conduits or channel of the class described with receptacles which are completely housed within the normal body lines of the conduit or wire carrying member and which may employ a single mounting and positioning means which also supports a clip or bracket for the lighting units.

These and other objects are attained by the means described herein and disclosed in the accompanying drawings, in which:

Fig. 1 is a rear elevational view of a show case having the lighting arrangement of the invention embodied therein.

Fig. 2 is a view taken on line 2—2 of Fig. 1.

Fig. 3 is a view taken on line 3—3 of Fig. 2.

Fig. 4 is a view taken on line 4—4 of Fig. 3.

Fig. 5 is a cross sectional view of an elbow or angle connector forming a detail of the invention.

Fig. 6 is a fragmental view; partly in cross section showing the manner of connecting two lengths of wiring conduit of the invention.

Fig. 7 is an enlarged view taken on line 7—7 of Fig. 1.

Fig. 8 is a perspective view of a mounting piece for fastening the wiring conduit to an all glass show case.

Fig. 9 is an enlarged view taken on line 9—9 of Fig. 1.

Fig. 10 is a view taken on line 10—10 of Fig. 9 showing the inside of a lighting unit casing and the connection of the prongs thereof with the wires for the lighting unit.

Fig. 11 is a view taken on line 11—11 of Fig. 7.

Fig. 12 is a perspective view of a connector clip or jaw forming a detail of the receptacle of the invention.

Fig. 13 is a perspective view of a receptacle forming a detail of the invention and employing the clips shown in Fig. 12.

Fig. 14 is a fragmental perspective of a wiring conduit of the invention showing the opening for the insertion of the receptacle of Fig. 13, and the means to connect square conduit to round conduit.

Fig. 15 is an end view showing the mounting of the round conduit in a square conduit by the elements shown in Fig. 14.

Fig. 16 is a cross sectional view showing the end closure of the square conduit, the closing member being also shown in perspective on a smaller scale at the right hand side thereof.

Fig. 17 is a cross sectional view showing the method of mounting the conduit, receptacle and unit holding clip upon a wood frame show case.

Fig. 18 is a view showing the ends of two wiring conduits and a channel-shaped connector and receptacle receiving member.

Fig. 19 is a view taken on line 19—19 of Fig. 17.

Fg. 20 is a perspective view of one of the receptacle halves or members shown in Fig. 17.

Fig. 21 is a fragmental view showing the arrangement of the invention with a modified or channel form of wire receiving element.

Fig. 22 is a perspective view of a pair of adapter members for connecting the wiring members of the invention to a flexible metal conduit.

Fig. 23 is a cross sectional view showing a wiring channel, channel cover and adapter in assembled position.

Fig. 24 is a view taken on line 24—24 of Fig. 23.

Fig. 25 is a perspective view of an elbow connector for the channel members shown in Figs. 21 to 24 inclusive.

Fig. 26 is a fragmental view, partly in cross section showing the assembled member of Fig. 25 and the channels.

Fig. 27 is a typical front elevational view of the channel type wiring showing the receptacle, channel connectors, channel covering and end closure.

Fig. 28 is an exploded view showing the elements embodied in Fig. 27.

Fig. 29 is a view taken on line 29—29 of Fig. 27.

The present invention provides for the equipping of new and previously installed show cases with a small obscure and easily installed metal conduit, preferably square in cross section, and which carries the necessary lead wires and also houses receptacles which provide for instantaneous insertion or removal of lighting units. The lead wires pass through a channel at the side of the receptacle, connecting into the receptacle and passing on through the conduit.

With such an installation the inside of the case may be thoroughly cleaned, the glass washed and incandescent globes inserted or removed without difficulty and in a minimum of time.

The lighting units are quickly removed and replaced without the use of tools.

The wiring and lighting system is furthermore simple to install in or remove from a show case either of the all glass type or of the wood frame type. The only tool required is a screw driver. A peculiar advantage lies in the ease and rapidity in which one or a bank of show cases may be quickly put back into illuminated service after accident or burning out of one lighting unit. With the present invention the damaged lighting unit (which may have caused a fuse in the supply circuit to burn out) is merely removed, whereupon the fuse, if destroyed, may be replaced. A spare lighting unit may be installed to replace the unit removed, or if desired all the other lighting units may be used without the replacement. All this is accomplished without the necessity of even disturbing the merchandise in the show case where the lighting unit became defective. In time and expense the repair is practically negligible when compared to the present day practice which usually requires putting the entire bank of show cases out of use while the trouble is found and the wiring pulled out for repair of the defective unit. The arrangement further facilitates the equipment of any cases which are usually shipped in knock-down form with ready installed wiring and receptacles so that the user of the case needs but connect the wires thereof with the electric supply circuit of the building and then push the lighting units into place in the receptacles. While the wiring and lighting unit construction of the present invention is particularly adaptable to show cases and the like; it will be understood that it is not restricted to such use since the small conduits would be practically obscured from view in many other installations, for example along the top of a picture molding, in portable booths, or in other locations.

The invention will be explained in connection with show case units, other installations being a matter of choice and being readily obvious. In Fig. 1 there is shown a show case having a base 30, side frames 31, and top frame 32. A section of flexible metal conduit 33 carrying supply wires 34 would be connected to a suitable floor outlet and would be brought through the base 30 of the case into a coupling 35. Coupling 35 as will be best seen in Figs. 2, 3, and 4 comprises a square hollow body having a rectangular opening 36 at the top for the reception of the square conduit member 37. The tube 37 is retained in snug fitting relation by means of a set screw 38. A web 39 is intermediate the end member 35 and has a central perforation 40 through which the wires 34 may extend. At the opposite end the member 35 has oppositely spaced arcuate grooves 41 which embrace four spaced peripheral portions of the flexible metal conduit 33, the latter being secured by means of set screw 42.

The coupling 35 and tube 37 would be positioned at the forward interior corner of the case, e. g. at the left-hand side, and the conduit 37 would have secured to its uppermost end an elbow member 43 with reduced square nipples 44 which slide into the ends of conduit sections 37. The ends of conduits 37 are notched at 45 to admit the shanks of fastening screws 46 which are threaded into nipples 44. The horizontal section of conduit 37 extends along the front top corner interiorly of the case and this section may comprise a single length of tubing or a plurality of sections. If several sections are used a double nipple 47 is employed having screws 48 as shown in Fig. 6.

At suitable intervals along any of the conduits 37 where lighting units are to be mounted openings 370 in the exposed vertical wall of the conduits are provided to receive receptacle bodies of insulating material. The receptacle bodies are two piece members, shown in Fig. 13 in separated condition and indicated generally by the reference numeral 49. A pair of cooperating bosses 50 and depressions 51 in the complementary parts 52 and 53 of receptacle 49 retain the parts against endwise displacement and the snug sliding fit of the receptacle 49 in the conduit 37 holds the parts tightly together without the use of additional fastening means. The opening 370 in conduit 37 is of a length greater than the distance between shoulders 54 on the exposed face of the receptacle 49 and less than the maximum overall length of said member. Both members 52 and 53 are tapered at opposite ends to enable entry thereof through opening 370 into the conduit.

The receptacle jaws 55 are connected to wires 34 before the receptacle is mounted in the conduit or tube 37. The connection is effected by drawing enough of the wires 34 out of the tube through opening 370 to conveniently make the connections. The two parts 52 and 53 of the receptacle 49 are readily separable and have in their abutting faces complementary depressions 57 which form pockets in which the jaw members 55 seat after the respective wires 34 are bared and looped one each about the screws 56 and fastened. The recesses 58 in member 53 and the corresponding grooves 580 in member 52 provide space for the entry and return of wires 34 through the ends of the receptacle. One of the wires enters this last mentioned space, has a bared portion secured as explained, is brought out through the same space, and is then turned about the end of the receptacle into the exterior channel 59 on member 53. The other wire 34 passes directly along through channel 59 to the opposite end of the receptacle and is looped back through the space between the receptacle members where it is connected with the remaining jaw 55 and then continues along with the first wire. When these connections are completed it is a simple matter to slip the wired receptacle back into the wired conduit 37 through opening 370. When the receptacle 49, completely wired is mounted in the conduit, the notches 60 render the jaws 55 accessible for the reception of contact prongs 61 of a lighting unit or other electrical appliance.

The lighting casing 62 has contact prongs 61 projecting therefrom. On the interior of this casing are wires 63 which connect to a suitable lamp socket or the like.

The casing may be of approved design so long as it seats snugly against a flat face of conduit 37 and the receptacle therein. A feature of the casing consists in the provision of insulating plate 64 which has bosses 65 seating in corresponding apertures in the casing wall and in which the prongs 61 are centered. Bendable clips 66 hold the member 64 to the inside face of the casing 62.

As can be best seen in Figs. 7, 10, and 17 a slightly resilient bracket 67 seats flush in a shallow groove 68 in the receptacle 49 and in notches 69 aligned therewith in the wall of conduit 37. The bracket is not restricted to this arrangement and furthermore may be supplemented by an additional bracket or brackets on conduit 37. In all-glass show case construction the T-shaped clip 70 (see Fig. 8) is passed through groove 71 in member 52 and then through a slot 72 in the rear wall of conduit 37 (see Fig. 14) and then between the top glass 74 (see Fig. 7) and the top edge of front glass 75 after which it is bent down as at 76. The resilient bracket may then be mounted in place by a screw 78 which passes through said bracket and the groove 79 in member 53 and into a tapped hole 80 in the rear wall of conduit 37. Screw 78 also holds the receptacle against longitudinal displacement. It will readily be seen that it requires but a few minutes to assemble and connect the entire structure and fasten it to a show case after which the lighting units 62 may be mounted by merely entering prongs 61 into slots 60 at which time the ear 81 on the end of bracket 67 will engage the bottom edge 82 of the lighting unit casing 62.

If the show case be of the wood frame type, clip 70 is omitted and a wood screw replaces screw 78 and is driven into the frame (as in Fig. 17). Thus the arrangement is adapted to use with either type of show case.

As shown at the left hand side of Fig. 14, means are provided whereby solid round conduit may be connected to the square conduit employed in the preferred form of the invention. These means are used to convert a previously installed system to the present system without discarding anything but the old relatively permanent lighting units which are replaced with sections of square conduit 37 of a length equal to that of the discarded units. The receptacle is mounted in this piece of conduit in the manner explained. The present type of lighting unit may then be removably mounted. The adapters each comprise an L-shaped member indicated generally as 118, and comprise a flange 119 with a bore 120 to coincide with the bore in the existing round conduit 121. Part 119 slides snugly into the square conduit section 37. The member 118 is pushed into conduit 37 so that the flange 122 lies against the inner front wall of the square conduit. A set screw 123 in flange 122 is received in the notch 45 in the end of the conduit and clamps the round tubing or conduit 121 firmly in place with the end of the round tubing abutting flange 119.

The receptacle is connected to the wires and the mounting of the section of square conduit and the lighting unit is effected in the manner previously described.

At the end of conduit 37 a closure is formed by simply inserting an L-shaped member 82 in the tube and fastening it with a screw 83 (see Fig. 16).

In Fig. 18 there is illustrated a modified form of wiring and receptacle wherein spaced ends of the conduit 37 are notched as in Fig. 6, the notches 45 receiving screws 84 which pass through an open channel member 85 which is wide enough to receive the conduit 37. Plate 86 lies inside conduit 37, and clamps it tightly to the channel when screw 84 is drawn up.

The receptacle used with this embodiment (see Fig. 20) comprises a member 87 quite similar to member 52 and a member 88 somewhat like member 53. A groove 89 for wires 34 is provided and apertures 90 permit a bare loop of the wires 34 to be passed about a screw 56 on a jaw member 55. The ends of this receptacle are shouldered to fit in the adjacent ends of conduit sections 37. This construction is adaptable to both wood frame and all-glass show cases and is illustrated in connection with the former in Fig. 17. Fig. 19 shows, in cross-section the receptacle in place in the channel and the conduit 37 clamped therein.

In Fig. 21 there is shown a fragmental view of a portion of a modified form of wiring arrangement, and in Fig. 26 there is shown the remainder of a typical assembly of the same form. This modified form distinguishes essentially in the provision of a U-shaped channel in lieu of the conduit 37 previously described and a removable cover strip for such channel. The open channel member 91 like conduit 37 is provided in suitable lengths and is initially connected to a flexible metal conduit 92 by the coupling detailed in Fig. 21. It comprises a square outer sleeve 93 in which is inserted a member 94 with a perforation 95 to receive the flexible metal conduit 92. Member 94 has a bore 96 through which a set screw 97 passes to bind the flexible conduit in place and to also position member 94 in sleeve 93. A section of U-shaped channel 91 is inserted in the opposite end of sleeve 93 and is retained therein by a set screw 98. A lug member 94 holds the cover strip 100 for the channel in place (see Figs. 23 and 24). The elbow member 101 has the arms 102 thereof adapted to slide into adjacent channel members 91. The covers 100 slide into the slots 103 (see Fig. 25) and screws 104 serve to hold elbow and channel against separation (see Fig. 26).

In Fig. 27 is shown a receptacle 105 which is inserted in the open bottom of channel 91. Apertures 106 in the channel wall will then coincide with the prong receiving openings 60 in the receptacle. This receptacle is a two piece member somewhat similar to receptacle 49 of Fig. 13. It has a bore 107 to receive screw 108 which clamps a pair of cover members 100 beneath a clamp plate 109 which may form part of a bracket for holding a lighting unit. This closes the wire channel 91. The receptacle 105 is cut away along one edge to provide a way 110 for the wires 34. Screw 108 engages in tapped hole 111 in channel 91.

One of the brackets 1090 is mounted in position in the manner just described. The previously described lighting units are employed with this and all of the other forms of the invention. Member 110 passes through slot 910 and is held by screw 108. This functions like the member 70 in Fig. 7. A hole 150 in the receptacle coincides with holes 1500 in the channel to receive a wood screw for mounting the device on a wood frame show case or the like (see Fig. 29). Member 112 is used to connect adjacent ends of adjacent cover strips on straight reaches of channel as is clearly illustrated at the center of Fig. 27 and in that portion of Fig. 28 immediately below it in the drawings. Screws 115 pass through member 112 and into threaded holes 1120 in channels 91.

A boxlike member 113 having slots 114 therein, closes the end of the channel form of wiring member. The end of cover member 100 is inserted into slots 114. Screw 115 passes through hole 116 and into a suitable tapped hole 117 in the channel member.

It will be noted that with each of the forms illustrated the mounting of the wire and receptacle carrying members is very simple and that the lighting units may be very quickly inserted and removed thus making it very easy to effect any manner of cleaning and servicing desired. The invention is therefore not to be considered as limited to the exact structural details described since these are subject to modification within the broader aspects of the invention.

What is claimed is:

1. In an illuminating system of the class described the combination of a hollow wire carrying conduit, a longitudinally divided receptacle member having its ends tapered whereby one side of the receptacle is longer than its opposite side, the conduit having an aperture in one face slightly shorter than the longer face of the receptacle and through which the receptacle may be entered angularly into the conduit, the receptacle being insertable within the conduit in such position that the ends of the longer side of the receptacle are disposed within the conduit beyond opposite ends of the aperture, and wires in the conduit electrically connected to electrical parts of the receptacle.

2. In combination a wire carrying conduit, having an exposed face cut away for a distance providing an elongated aperture, an elongated receptacle tapered at its ends whereby one of the tapered ends may be inserted through the aperture into the conduit beyond the end of the aperture and then seated bodily into the conduit through said aperture for adjustment wherein the aperture is entirely closed by said receptacle and means whereby the receptacle is retained against longitudinal shifting in the conduit.

3. In a showcase lighting system the combination of a conduit having an elongated aperture in one face thereof, current carrying wires in said conduit and a two-part receptacle member electrically connected to said wires and insertable angularly into the aperture and then bodily through the aperture to a position wholly within the conduit and closing the aperture, a bracket, means passing through the receptacle and the conduit for securing said parts together, and a lighting unit comprising a casing engageable by the bracket and a pair of electrical conducting prongs receivable in the receptacle whereby the lighting unit is detachably connected bodily and electrically to said conduit and wires respectively.

4. In a lighting system for show cases and the like the combination of a wire carrying conduit member having an aperture therein, an elongated receptacle member of a cross section such that it fits into the interior of the conduit and of a length such that it closes the aperture in the conduit, a lighting unit comprising a casing and prongs on the casing for carrying current from the receptacle to the interior of the casing, said lighting unit being detachably connectible both bodily and electrically to said conduit and receptacle, and releasable bracket means holding the lighting unit in position relative to the conduit and receptacle.

5. In combination a rectangular conduit adapted adjacent its end for the reception of a set screw, an L-shaped member comprising a pair of angularly disposed leaves, one of said leaves being of a size such that it closes the interior opening of the conduit and being furthermore bored to coincide with a round conduit, the other leaf lying against the inner face of the rectangular conduit and having a tapped perforation, and a set screw extending through the rectangular conduit and through said tapped perforation for holding the L-shaped member in said rectangular conduit and wedging the round conduit securely in said L-shaped member.

6. The combination with a rectangular sheet metal conduit having an elongated portion of one side wall cut away to provide an aperture, of a pair of complementary insulating members providing a receptacle body, said members being cut away on their meeting faces to provide spaced retaining pockets for holding and positioning a pair of jaw members, and further providing for endwise communication of electric wires to said respective jaws, one of the members being also exteriorly channeled to receive said wires within the body lines thereof, said wires being connectible to the jaws while the receptacle is in a disassembled condition and placed together for subsequently bodily insertion of the wired receptacle into the conduit through said aperture in the conduit.

7. In a showcase lighting construction the combination of a rectangular conduit provided at intervals with apertures for the bodily reception of electric receptacles, bi-partite receptacles insertable in the conduit through said apertures, the conduit and said receptacle being bored, and a fastening means passing through said bores for holding the receptacle within the conduit against longitudinal shifting and for securing the conduit to a mounting surface.

8. In a device of the class described the combination of a square wire carrying conduit, electric current carrying wires in said conduit, the conduit being apertured, a bi-partite elongated receptacle disposed within said conduit and having prong receiving jaw openings coinciding with the apertured portion of the conduit, the receptacle being longitudinally cut away at one side to permit passage of the wires through the conduit and said way, the two parts of the receptacle being held together by frictional binding on the inside of the conduit, said parts being hollowed out to form holding and positioning pockets for spaced contact jaws, contact jaws in said pockets and bared loops on the respective current carrying wires extending into the receptacle adjacent opposite ends thereof and electrically connected with the respective jaws.

9. In combination a conduit substantially rectangular in cross section and having an apertured front wall and a slot in the rear wall, a receptacle disposed within the conduit and closing the aperture, said receptacle being notched, and a bendable member extending into the notch and through the slot in the conduit and forming a support means for the conduit.

10. In combination a small wire-carrying conduit rectangular in cross section and having an aperture therein, a receptacle member comprising prong receiving jaws disposed wholly within the conduit and closing the aperture therein, a lighting casing having conductor prongs extending therefrom and insertable in the jaws, and a clip member supported on the conduit and engaging an edge of the lighting casing and forming together with the prongs a three-point support for the casing on the conduit.

11. In a lighting system the combination of a conductor carrying conduit, an elongated receptacle of a cross section such that it fits into the interior of the conduit, prong receiving jaws in the receptacle, the conduit being apertured to afford access to the jaws from the exterior of the conduit, a lighting unit comprising prongs for entry into the jaws for carrying current from the receptacle to said unit, said lighting unit being detachably connectible bodily and electrically to the conduit and receptacle, and releasable means holding the lighting unit in position relative to the conduit and receptacle.

12. In a device of the class described the combination of a rectangular conductor carrying conduit, conductors in said conduit, the conduit being apertured, a bi-partite receptacle disposed within said conduit and having prong receiving jaw openings coinciding with the apertured portion of the conduit, the receptacle having a longitudinal way to permit passage of the conductors therethrough, cooperating boss and recess means on the receptacle parts precluding longitudinal shifting of the parts relative to one another, the parts being held against separation by frictional binding on the inside of the conduit, contact jaws in the receptacle and loops on the conductors extending into the receptacle adjacent opposite ends thereof and electrically connected with the respective jaws.

JOSEPH A. COY.